United States Patent
Arnett et al.

[11] 3,983,589
[45] Oct. 5, 1976

[54] COATED CONDUIT THREADER

[76] Inventors: Robert H. Arnett, 524 Bellview Ave., Lakeland, Fla. 33803; L. Joe Dias, Rte. 2, Box 658D, Lakeland, Fla. 33803; Max E. Gainey, 9302 Hartts Drive, Tampa, Fla. 33617; William D. Kira, 4620 S. Harding Ave., Lakeland, Fla. 33803; Otis O. Varnes, Jr., Rte. 2, Box 1212, Lakeland, Fla. 33803

[22] Filed: Mar. 21, 1975

[21] Appl. No.: 560,963

[52] U.S. Cl. .............................. 10/106; 10/89 R; 10/107 PH
[51] Int. Cl.² .......................................... B23G 1/22
[58] Field of Search .......... 10/87, 89 R, 106, 107 R, 10/107 PH, 94, 96 R; 279/7, 99

[56] References Cited
UNITED STATES PATENTS

| | | | |
|---|---|---|---|
| 1,124,692 | 1/1915 | Boax | 10/107 PH |
| 1,859,882 | 5/1932 | Nonneman | 10/89 R |
| 2,224,691 | 12/1940 | Pealer | 10/89 R |
| 2,788,980 | 4/1957 | Black | 279/7 |
| 2,792,230 | 5/1957 | Schober | 279/7 |
| 2,984,495 | 5/1961 | Holt | 279/7 |
| 3,274,627 | 9/1966 | Behnke | 10/96 R |
| 3,413,667 | 12/1968 | Behnke | 10/89 R |
| 3,464,711 | 9/1969 | Franke | 279/7 |
| 3,499,178 | 3/1970 | Blake | 10/107 PH |
| 3,631,552 | 1/1972 | Ivester | 10/107 PH |

*Primary Examiner*—Milton S. Mehr
*Assistant Examiner*—E. M. Combs
*Attorney, Agent, or Firm*—Duckworth, Hobby, Orman, Allen & Pettis

[57] ABSTRACT

A threading apparatus of the type primarily intended for use in threading cylindrical work stock comprising a support table, a carriage movably disposed on the top of the table, a motor fixedly attached to the table top in engaging relation to one end of the work stock, and a die head mounted on the carriage in cooperative relation to the other end of the work stock. By virtue of the construction and arrangement of the various elements one to the other, individual pieces of work stock of varying length may be threaded. Additionally, work stock including a protective exterior coating may be threaded without damaging the integrity of the coating.

11 Claims, 4 Drawing Figures

U.S. Patent  Oct. 5, 1976  3,983,589
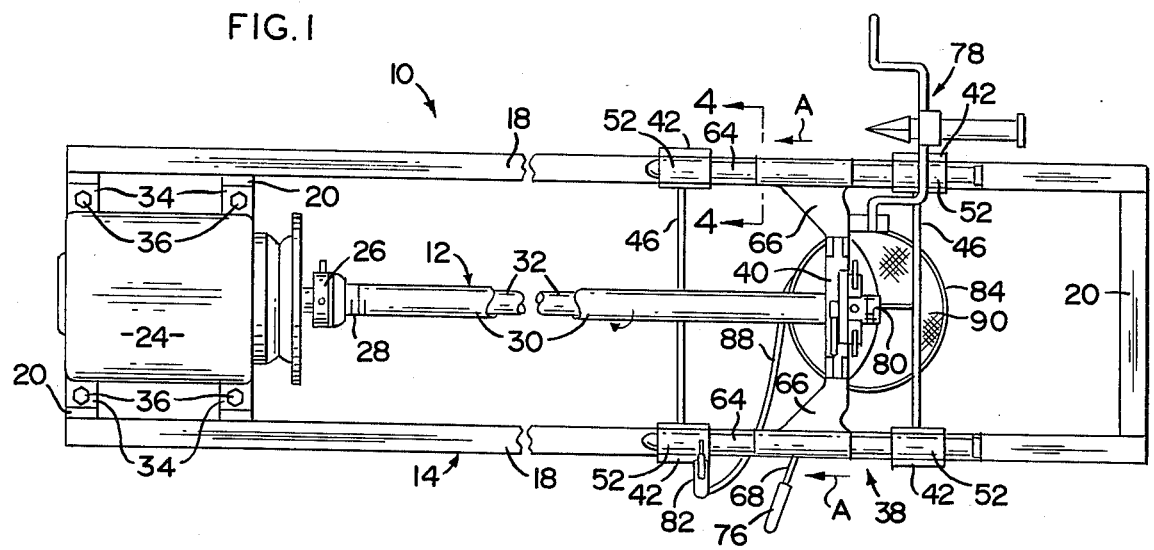
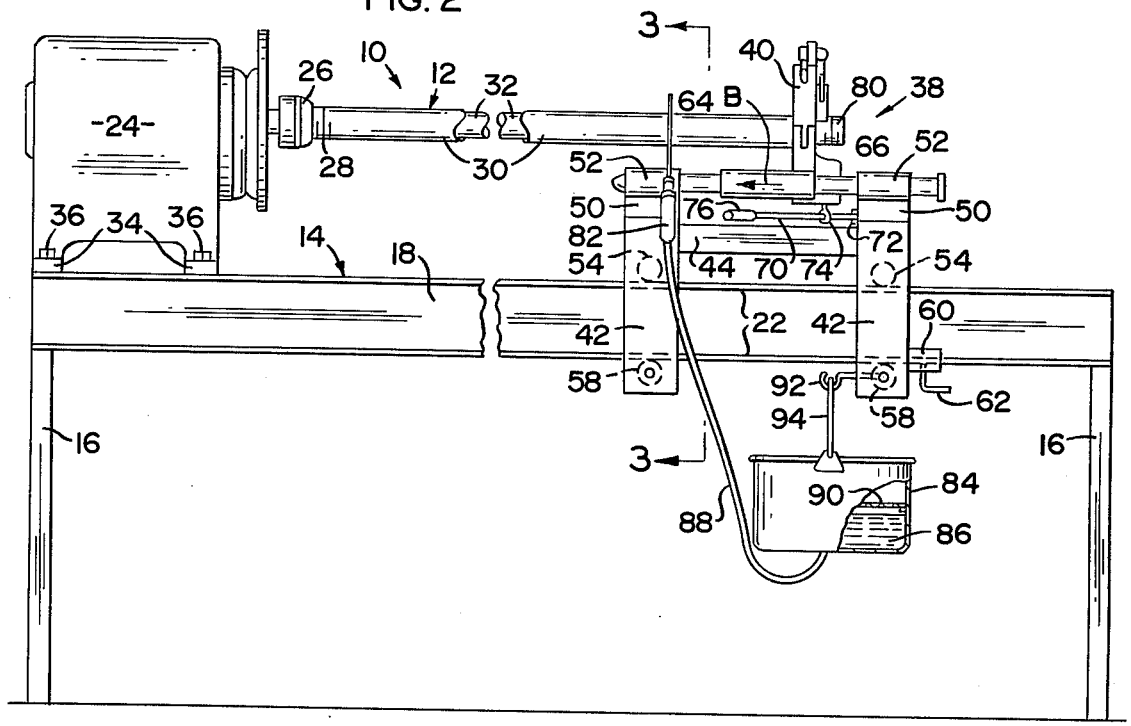
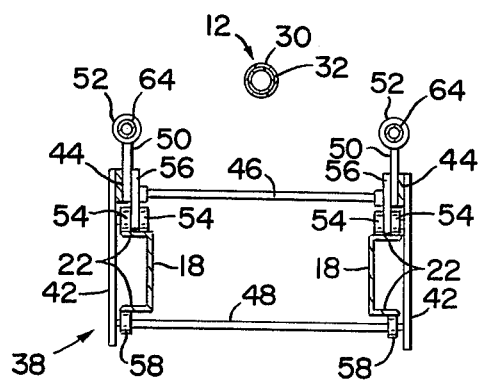
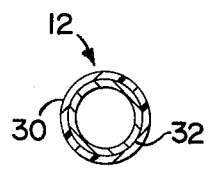

COATED CONDUIT THREADER

BACKGROUND OF THE INVENTION

1. Field of the Invention

This invention relates to a threading apparatus including means for positioning and threading one end of individual pieces of work stock of varying longitudinal dimension. Though not limited thereto, the apparatus is particulary suitable for threading conduit including a protective exterior and interior coating without damaging the intergrity of the coating coextensive with its unthreaded portions.

2. Description of the Prior Art

Various types of threading devices, particularly devices intended for use in applying external threads to a cylindrical conduit, are well known in the prior art. These prior art devices basically comprise two elements: a motor which engages and rotate the conduit, and a cutter or die head which is attached to the motor in engaging relation to the end of the conduit on which threads are to be cut. The operation of such prior art devices may be generally summarized as follows.

Having selected the appropriate die head for the desired threads and conduit size, the operator places the end of the conduit to be threaded through an aperture formed in the motor. Vice-like jaws mounted within the motor in surrounding relation to the aperture are then tightened around the conduit, firmly holding it in place. The motor is then energized causing the jaws and the conduit to rotate rapidly about the conduit's longitudinal axis. It should be noted that the end of the conduit into which threads are to be cut extends approximately six inches from the motor in the direction of the die head. The die head is attached to the motor so that it may be moved in reciprocating fashion along the axis of the rotating conduit.

The die head is then urged into engagement with the rotating conduit, and the dies cut the desired threads. Once the specified section of threads are cut, the motor is switched off, and the dies are opened and released. The threads are then cleaned and finished by a reamer attached to the die head assembly.

With regard to such prior art threading devices, two points are particularly noteworthy. First, by virtue of its attachment to the motor, the die head is limited to a travel distance along the axis of the rotating conduit of approximatey eight inches. Inasmuch as conduit is normally supplied in standard lengths of 10 feet, as much as 9 feet of rotating conduit is often times extending beyond the after end of the motor. Not only does this present a potential hazard, but also this conduit must be supported to prevent it from bending or breaking. Second, severe physical pressure must be applied to the exterior of the conduit by the vice-like jaws of the motor in order to rotate it and prevent it from slipping when engaged by the die head.

While the suitability of such prior art devices can not be disputed in light of their long standing commercial success, recent technological advances in the production of special-purpose conduits have focused the industry's attention on certain inherent shortcomings of such devices. Of particular note is the inability of these prior art devices to thread conduit including a protective exterior and interior coating without damaging the protective coating. Coated conduit is used in application where the conduit will be exposed to a deleterious environment in order to prolong the useful life of the conduit. In such uses it is immediately apparent that any penetration of the protective coating necessarily results in its useful life being shortened. Such is obviously counter productive in economic terms.

Nevertheless, coated conduit must be cut and threaded, and the only means available for theading coated conduit have been those such as described above. In order to hold the coated conduit with sufficient force to accomplish the threading operation, it is necessary to tighten the jaws of the motor sufficiently to penetrate the coating and grip the conduit itself. If the jaws are not tightened sufficiently, the conduit will twist within its coating, resulting in relatively large tears in the protective shield. At the very least, then, it is obvious that the coating is punctured at a plurality of points by the motor's jaws. At the very most, the protective coating is completely torn away.

In recognition of the inherent problems attendant to threading coated conduit, the conduit industry in cooperation with the threading industry has devised a stop-gap solution. Suppliers of coated conduit sell purchasers of coated conduit a coating solution to be used for "touching up" the punctures and tears resulting from the threading operation. Such solution is far from perfect for a number of reasons. First, expensive man hours are consumed in applying the touch-up solution and allowing it to dry. Second, and perhaps even more importantly, such a manually applied coating often time does not provide the quality of protection afforded by the original coating. This, of course, results in more frequent replacement of conduit sections.

Accordingly, it is obvious that there is a great need in the industry for a threading apparatus which is capable of threading coated conduit without thereby damaging the integrity of the coating. Of course, such an apparatus should also be capable of being manufactured at a reasonable price and should be simple to use. Additionally, such a device should be capable of threading uncoated materials, thereby eliminating the necessity of purchasing, maintaining and operating separate threading devices for individual applications.

SUMMARY OF THE INVENTION

This invention relates to a threading apparatus of the type primarily intended for use in threading conduit, and particularly applicable for use in threading conduit including a protective coating applied to its exterior and interior surface. While the apparatus will hereinafter be described with particular reference to its use in threading conduit-type material, it is to be understood that the apparatus is equally applicable for use in threading solid-core cylindrical material.

Most succinctly stated, the threading apparatus comprises four elements: a support means, a carriage means movably disposed on the support means, a motor means fixedly attached to the support means, and a thread-forming means mounted on the carriage meansA length of conduit to be threaded extends from the motor means to the thread-forming means. More specifically, the support means comprises a support table held above the supporting surface by a plurality of legs. The support table of the present invention is preferably formed from two beams of substantially U-shaped cross-sectional configuration. For reasons which will be explained in greater detail hereinafter, each of the beams is arranged with the open portion of its U-shaped configuration extending outwardly from the sides of the support table. The beams are held in fixed, spaced relation to each other by a plurality of cross ties fixedly attached therebetween.

The carriage means comprises a chassis of predetermined configuration mounted on the support table and freely movable along the longitudinal dimension thereof. Roller means are mounted on the chassis and support the chassis on the support table to facilitate the chassis's reciprocating movement therealong. Lock means are also provided on the chassis in engaging relation to a portion of the support table so that its position with respect to the longitudinal dimension of the table may be selectively fixed.

A motor means comprising a standard pipe threading drive motor is fixedly mounted at one end of the support table. Though not mandatory, the motor means of the present invention preferably includes a nipple chuck mounted therein and extending toward the carriage means. Inasmuch as conduit is normally supplied with one end already threaded, the nipple chuck is used to attach the threaded end of the conduit in driven relation to the motor. A thread-forming means comprising a die head is disposed on the carriage means in corresponding relation to the motor. It should be noted that the die head is free to move laterally with respect to the axis of the conduit being threaded by virtue of its sliding engagement to two guides. It is these guides that are fixedly attached to the carriage means so that the entire thread-forming unit travels with the carriage. The attachment is accomplished by passing the guide means through receptor means comprising collars formed on the carriage. Once placed in position, the center of the die head is aligned in corresponding relation to the axis of the conduit being threaded. The thread-forming means of the present invention further comprises reamer means used to clean and finish the threads.

Inasmuch as it is well known that extreme frictional heat is generated by the action of the die head on the conduit, the present invention further comprises oiler means, whereby oil may be applied to the conduit and die head as the threads are being formed. The oiler means comprises an oil spray connected in fluid communicating relation, as by a flexible tube, to an oil reservoir. For convenience, though not mandatory, the oil spray is removably attachable to the carriage so as to be readily available for use. Similarly, the oil reservoir may be removably attachable to the carriage in a position directly beneath the die head. The oil reservoir further comprises a filter means placed therein, whereby excess oil applied to the conduit as it is threaded may be filtered and collected for reuse.

The operation and use of the threading apparatus of the present invention may be briefly summarized as follows: first, because conduit is normally provided in standard ten foot lengths, the support table is of sufficient longitudinal dimension to allow for the insertion of up to a ten foot section of conduit between the motor and die head. Assuming that a section of coated conduit is to be threaded, the operator first fits the factory-threaded end into the nipple chuck of the motor. The carriage lock means is released and the carriage is adjusted so that the threadforming means just engages and supports the free end of the coated conduit. The carriage is then locked in this position. Having selected and adjusted the die head with relation to the outside diameter of the conduit and the type of threads to be cut, the motor is energized, resulting in rotation of the coated conduit. The die head is then urged, by means of a lever formed on the die head, on its guides into engaging, cutting relation to the blank end of the coated conduit. As the die head engages the coated conduit, the predetermined threads are cut, automatically pulling the die head forward along the axis of the rotating coated conduit. When the sufficient number of threads have been cut, the operator switches the motor off, removes the die head, re-energizes the motor, and cleans and finishes the threads with the reamer provided for that purpose. The motor is again switched off, the carriage is unlocked and rolled away from the newly-threaded conduit, and the conduit is removed from the apparatus. Of course, during the threading operation oil is applied to the conduit and die head to prevent their overheating.

It is thus apparent that by virtue of the construction of the threading apparatus, the integrity of the conduit's protective coating is maintained say for that area where threads are formed.

Additionally, inasmuch as the entire length of conduit extends between the motor and the die head, it is comtemplated that it may be desirable to provide supports for the conduit at predetermined points along its longitudinal dimension to prevent it from sagging. These supports may take the form of substantially Y-shaped members removably disposed in supporting relation to the conduit in apertures formed in the cross ties of the support table. If relatively short lengths of conduit are being threaded, the use of these supports would not be required.

It should also be noted that the standard motor such as that utilized in the threading apparatus normally includes both forward and reverse modes of operation. It has been determined that reversing the motor of the present invention unnecessarily strains the nipple chuck and can result in shearing of the conduit. Accordingly, the motor of the present invention is preferably modified to include an anti-reverse stop on the switch to prevent inadvertent reversing of the motor. For the convenience of the operator, it is further contemplated that remote switch means may be provided in relatively close proximity to the carriage, so that the operator does not have to walk back and forth between the motor and the carriage in order to operate the apparatus.

Finally, while above description has been given with specific regard to threading a coated conduit, it is of course to be understood that the threading apparatus herein described is equally suitable for use with uncoated conduit. When being utilized to thread such uncoated conduit, the nipple chuck need not necessarily be employed.

This invention accordingly comprises an article of manufacture possessing the feature, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a top plan view of the threading apparatus including a length of coated conduit disposed in thread-forming position.

FIG. 2 is an elevational view of the threading apparatus depicted in FIG. 1.

FIG. 3 is a sectional view taken along line 3—3 of FIG. 2.

FIG. 4 is a sectional view taken along line 4—4 of FIG. 1.

Similar reference characters refer to similar parts throughout the several view of the drawings.

DETAILED DESCRIPTION

This invention relates to a threading apparatus, a preferred embodiment of which is generally indicated as 10 in the plan view of FIG. 1. A section of conduit 12 which may be coated, is operatively connected to the apparatus 10 in working relation thereto. As most clearly seen in FIG. 2, apparatus 10 comprises a support means including support table 14 and legs 16 disposed in supporting relation to table 14. Legs 16 may be attached to support table 14 by any conventional fastening means, but welding is preferred for reasons of stability and strength.

Support table 14 is preferably formed from two beams 18, said beams 18 being held in spaced, substantially parallel relation one to the other by a plurality of cross ties 20. As with legs 16, cross ties 20 may be attached to beams 18 by any suitable fastening means, but welding is preferred. As best seen in FIG. 3, beams 18 may comprise a substantially U-shaped cross sectional configuration with short arms 22 extending outwardly from the sides of support table 14.

A driving motor 24 is mounted at one end of support table 14 in driving relation to coated conduit 12. In the embodiment shown in the drawings, motor 24 further comprises nipple chuck 26 mounted thereon in direct engaging relation to coated conduit 12. Nipple chuck 26 includes a threaded receptor whereby factory-threaded end 28 of coated conduit 12 may be attached in driven relation to motor 24. By virtue of this construction coated conduit 12 can be rotated by a motor 24 without damaging the protective coating 30 placed in surrounding relation to conduit core 32. A plurality of flanges 34 are formed on motor 24. Fastening means 36 are connected through corresponding apertures formed in flanges 34 and are attached adjacent cross ties 20 thereby securing motor 24 to support table 14.

A carriage means generally indicated as 38 in FIGS. 1 and 2 is disposed on support table 14 for reciprocating movement relative thereto as indicated by arrows A in FIG. 1. As best seen in FIG. 2, thread forming means, comprising die head 40, is attached to carriage means 38 such that the center of die head 40 is coincident with the axis of rotation of coated conduit 12. The precise manner of this attachment will be described in greater detail hereinafter.

As best seen in the cross-section view of FIG. 3, carriage means 38 is disposed in surrounding relation to beams 18 defining the sides of support table 14. Carriage means 38 comprises an open-ended, box-like chassis, four corners of which are defined by side arms 42. Side arms 42 on the same side of beam 18 are held in fixed predetermined relation to each other by side member 44. The box-like chassis is completed by top cross member 46 and bottom cross member 48 fixedly disposed in interconnecting relation between corresponding side arms 42 in substantially transverse relation to the longitudinal dimension of support table 14.

Carriage means 38 further comprises receptor means 50 including collars 52 disposed at each corner of carriage means 38 and extending upwardly relative to support table 14. Adjacent pairs of receptor means 50 and collars 52 are disposed a predetermined distance one from the other and collars 52 are configured to retain die head 40 such that its center will be coincident with the axis of rotation of coated conduit 12.

To facilitate the longitudinal movement of carriage means 38 along support table 14, rollers 54 are attached to carriage means 38 by axle arms 56 in engaging relation to the top of support table 14. Secondary rollers 58 may be disposed on bottom cross members 48 in engaging relation to the bottom of support table 14, as shown in FIG. 3, to further facilitate movement of carriage means 38.

A stop means comprising bracket 60 and lever 62 is disposed on one of the side arms 42 such that lever 62 may be selectively adjusted into engaging/disengaging relation to a portion of one of the beams 18. Lever 62 preferably comprises a set screw mounted in a threaded aperture formed in bracket 60. While FIG. 2 illustrates a single stop means, it is of course obvious that similar devices could be provided on each of the side arms 42 so that an operator could lock carriage means 38 from either side of apparatus 10. The purpose of the stop means is to enable the operator to fix the position of carriage means 38, and therefore of die head 40, as required by the length of coated conduit 12.

The attachment of the thread-forming means comprising die head 40 to carriage means 38 will now be described. In addition to die head 40, the thread-forming means further comprises guide means including two guide arms 64. Guide arms 64 extend on each side of die head 40 in substantially parallel relation to the axis of rotation of coated conduit 12. Guide arms 64 are connected to die head 40 by passing them through apertures formed in die legs 66 extending outwardly from die head 40. Guide arms 64 are fixedly attached to carriage means 38 by passing each guide arm 64 through corresponding collars 52 formed at the top of receptor means 50. Thus, the entire thread-forming means travels with carriage means 38. In addition, die head 40 may be independently moved relative to carriage means 38 as indicated by arrow B in FIG. 2 even if carriage means 38 is locked by tightening lever 62. This reciprocating motion of die head 40 is obviously made possible by virtue of the sliding engagement of die legs 66 around corresponding guide arms 64. The movement of die head 40 is actually accomplished by the operator's manipulating die head controller 68. As best seen in FIG. 2, die head controller 68 comprises a substantially S-shaped bar 70 pivotally attached at one end 72 to a receptor means 50 and passing through a ring 74 formed beneath die head 40. The free end of bar 70 extends outwardly from support table 14 and is provided with a handle 76. The point of contact between bar 70 and ring 74 acts as a fulcrum to translate relatively horizontal movement of handle 68 into corresponding reciprocating movement of the center of die head 40 along the axis of rotating coated conduit 12.

The thread-forming means may further comprise a reamer generally indicated as 78 movably attached to die head 40 and positionable in corresponding relation to the axis of rotating coated conduit 12. As previously described, reamer 78 is utilized to clean and finish threads cut by die head 40.

Finally, threading apparatus 10 further comprises oiler means disposed in fluid dispensing relation to carriage means 38. Oil may be applied to the points of contact between conduit end 80 and die head 40 as the threads are cut. The oiler means comprises oil spray means 82 which is removably attachable to carriage means 38 and is in fluid communicating relation to oil reservoir 84. Oil spray means 82 is hand-operated to dispense oil 86 and is preferably attached to oil reservoir 84 by flexible tube 88. To conserve the consumption of oil, reservoir 84 further includes filter means 90 disposed therein. Reservoir 84 is positioned beneath die head 40 and collects excess oil 86 dispensed by oil spray means 82. Obviously, the purpose of filter means 90 is to remove metal shavings obtained during the threading operation. In order to insure the oil reservoir 84 is always positioned beneath die head 40, a hook 92 is formed on one of the bottom cross members 48. Bail 94 of oil reservoir 84 is placed in hook 92, thereby causing oil reservoir 84 to travel simultaneously with carriage means 38 and die head 40.

To use threading apparatus 10, the operator first adjusts carriage means 38 according to the length of coated conduit 12 being threaded. Using lever 62, carriage means 38 is locked in position on support table 14. The operator next attaches factory-threaded end 28 of coated conduit 12 to nipple chuck 26. He next pulls forwardly on handle 76 of die head controller 68 so that die head 40 supports end 80 of coated conduit 12. Driving motor 24 is electrically operated (not shown), and it is now energized resulting in rotation of coated conduit 12. The operator again pulls forwardly on handle 76 causing die head 40 to engage conduit 80 in a cutting relationship. Once the first thread is cut into end 80, die head 40 will pull itself along coated conduit 12 by virtue of the sliding engagement between die legs 66 and guide arms 64. As the threads are being cut the operator uses oil spray means 82 to apply cooling oil 86 to the points of contact between conduit end 80 and die head 40. When the specified length of threads has been cut, the operator switches driving motor 24 off and disengages cutting head 40. He then positions reamer 78 in cooperative relation to conduit end 80, energizes driving motor 24, and uses reamer 78 to clean and finish the newly formed threads. Following this cleaning and finishing operation the operator again switches driving motor 24 off, releases lever 62, withdraws carriage means 38 clear of conduit end 80, and unscrews factory-threaded end 28 from nipple chuck 26.

While the above detailed description has been given with specific regard to threading a section of conduit including a protective coating on the exterior thereof, it is to be remembered that threading apparatus 10 is equally applicable for use with uncoated conduits. In fact, uncoated material may be threaded precisely as described above. Alternately, uncoated material may be clamped directly into driving motor 24 without the necessity of utilizing nipple chuck 26. Obviously, as previously discussed, such a procedure should be utilized only with full knowledge of the fact that directly clamping the conduit into driving motor 24 will necessarily result in some scarring of the conduit's exterior surface.

It will thus be seen that the objects made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, We claim:

1. A threading apparatus of the type primarily intended for use in threading work stock including a coated conduit, said apparatus comprising: support means including a support table of predetermined length and width and a plurality of legs attached in supporting relation to said support table, carriage means movably disposed on said support table, motor means mounted on said support table in engaging relation to one end of the work stock being threaded; thread forming means mounted on said carriage means in engaging relation to the other end of the work stock relative to said support table and said motor means in substantially contiguous relation to the portion of the work stock where the thread is formed, said carriage means mounted on said support table in remote spaced apart location from said motor means, said thread forming means movably mounted on said carriage in sliding engagement with the work stock, said thread forming means comprising a die head mounted to move on said carriage means in a linear direction relative to the longitudinal axis of the work stock and in sliding engagement with the work stock, said carriage means being movably secured to and engaging said work stock exclusively by cutting engagement of said die head therewith, whereby activation of said motor means causes rotation of the work stock and linear movement of said die head along the work stock.

2. An apparatus as in claim 1 wherein said carriage means comprises a chassis disposed in substantially surrounding relation to a portion of said support means, said chassis comprising receptor means formed thereon whereby said thread-forming means may be attached to work stock in moving relation to said other end of the work stock.

3. An apparatus as in claim 2 wherein said receptor means comprise a plurality of collars, at least two of said collars being disposed on opposite sides of said chassis in predetermined spaced relation to said top of said support means.

4. An apparatus as in claim 2 wherein said carriage means further comprises roller means movably disposed on said chassis in supporting relation between said chassis and said support means whereby said carriage means may be positioned along the longitudinal dimension of said support means.

5. An apparatus as in claim 2 wherein said carriage means further comprises stop means mounted on said chassis in engaging relation to a portion of said support means, whereby said carriage means may be positioned a predetermined distance from said motor.

6. An apparatus as in claim 1 further comprising oiler means disposed in fluid dispensing relation to said carriage means, whereby oil may be applied to said other end of the work stock as it is threaded.

7. An apparatus as in claim 6 wherein said oiler means comprises oil spray means removably attachable to said carriage means and oil reservoir means connected in fluid communicating relation to said oil dispensing means.

8. An apparatus as in claim 7 wherein said oil reservoir means is removably attachable to said carriage means, said oil reservoir means including filter means disposed therein, whereby excess oil applied to the work stock may be filtered, collected and re-used.

9. An apparatus as in claim 1 wherein said motor means comprises chuck means attached thereto in engaging relation to said one end of the work stock.

10. An apparatus as in claim 9 wherein said chuck means comprises a nipple chuck.

11. An apparatus as in claim 1 further comprising a plurality of guide means, said guide means being attached to said carriage means, and said die head being movably disposed on said guide means.

* * * * *